United States Patent Office 3,836,524
Patented Sept. 17, 1974

3,836,524
PREPARATION OF ESTERS OF THIOCARBAMIC
ACIDS
Harold M. Pitt, Lafayette, Calif., assignor to Stauffer
Chemical Company, Westport, Conn.
No Drawing. Filed Apr. 26, 1973, Ser. No. 354,591
Int. Cl. C07c 155/02
U.S. Cl. 260—239 BF       16 Claims

ABSTRACT OF THE DISCLOSURE

This invention relates to a new process for preparing esters of thiocarbamic acids comprising (a) reacting a carbamyl chloride with a mercaptan in the presence of aqueous solution of a caustic agent, preferably excess caustic agent; (b) separating the organic and aqueous phases and (c) recovering the thiocarbamic acid ester from the organic phase.

BACKGROUND OF THE INVENTION

Field of Invention

This invention relates to a novel method of preparing members of the class of compounds known as thiocarbamates. More particularly, this invention relates to the method of preparing esters of thiocarbamic acids by the reaction of an appropriate carbamyl chloride and requisite mercaptan in the presence of an aqueous solution of a caustic agent.

The general reaction scheme can be represented as follows:

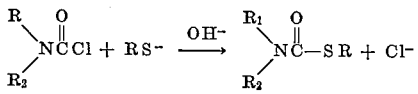

R, $R_1$ and $R_2$ are defined hereinafter.

Description of Prior Art

The prior art contains many various procedures for preparing and obtaining members of the class thiocarbamates. The instant process includes certain preferred and desired advantages which will become apparent throughout the description to follow.

The esters of thiocarbamic acids are useful for a number of purposes, including use as herbicides. Some are effective for inhibiting the growth of micro-organisms such as bacteria. Others are valuable as insecticides. Therefore, the preparation of this class of compounds is desirable. Heretofore, such esters have been difficult to prepare because the preparation require reagents, such as phosgene, which are difficult to handle or to employ reagents which leave residue problems and cause contamination.

U.S. Pat. 2,983,747 employs zinc chloride as a catalyst in the direct reaction of carbamyl chloride with mercaptans to produce various thiocarbamic esters. The reaction can be conducted without the use of a solvent, however, a solvent inert to the catalyst, such as an organic solvent, must be used if a solvent is employed.

U.S. Pat. 2,913,327 teaches the preparation of the sodium salt of a mercaptan followed by reaction with a carbamyl chloride in the presence of a solvent. The use of the sodium salt of the mercaptan causes problems of filtration and solids handling. The use of a solvent involves the reduction of reactor throughput, as well as the solvent recovery which can be a problem. Hydrogen is evolved when making the sodium salt of the mercaptan, this causes a further disposal problem.

Another process is the reaction of the mercaptan with the carbamyl chloride in the presence of an acid binding agent such as pyridine. These agents are toxic, expensive and pose difficult recovery problems. The value of the hydrogen chloride is lost.

Another process for preparing esters of thiocarbamic acids is the reaction of an appropriate chlorothioformate and secondary or primary amine in the presence of an inert solvent such as diethyl ether or n-pentane, and in the presence of a suitable hydrogen chloride acceptor, including the tertiary amines, such as triethylamine and pyridine.

U.S. Pat. 3,133,947 describes the preparation of esters of thiocarbamic acids by a process comprising reacting a secondary or primary amine with carbonyl sulfide in the presence of a basic material which may be any amine, including a tertiary amine, and thereafter reacting the intermediate with an organic sulfate, such as dialkyl sulfate or diallyl sulfate. This process is unfavorable because of the special gas handling equipment required for the carbonyl sulfide addition. Further, alkyl sulfate values are lost which add to the expense of the overall process.

SUMMARY OF INVENTION

It is the object of this invention to provide a process for the preparation of esters of thiocarbamic acids in high yields with convenient starting materials which are easy to handle in a novel reaction system heretofore unknown.

It is a further object of this invention, as will become apparent during the course of the description, that undesirable gases, such as carbonyl sulfide, are not required. Further, tertiary organic amines as acid acceptors or catalysts are not required.

This invention, therefore, relates to the method of preparing esters of thiocarbamic acids by the reaction of an appropriate carbamyl chloride and requisite mercaptan in the presence of an aqueous solution of a caustic agent. The above and related objects are accomplished by a process which may be represented by the following typical equation:

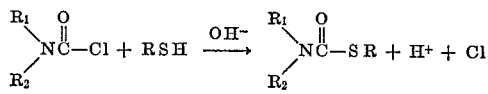

wherein R, $R_1$ and $R_2$ are as defined hereinafter.

Certain side reactions may take place simultaneously with the above-mentioned reaction. These side reactions may use up large amounts of the starting materials with a consequent lowering of the yield of the desired thiocarbamic ester. The control of the desired reaction is therefore very important, so that the amount of the undesirable by-products produced therein will be minimized.

The steps of the process of this invention comprise reacting an appropriate carbamyl chloride with a selected mercaptan in the presence of an aqueous caustic solution. The general procedure comprises adding the requisite mercaptan to an aqueous caustic solution to form the corresponding salt in situ. Thereafter, the appropriate carbamyl chloride is mixed with the salt-containing caustic solution. The reaction vessel is maintained at the desired temperature for the necessary time to achieve efficient and economical yields of the corresponding ester of the thiocarbamic acid. Also contemplated within the steps of this process is the addition of a mixture of the mercaptan and the carbamyl chloride to the aqueous caustic solution. This latter means of addition is preferred when the mercaptan forms a solid in the aqueous caustic solution, for example, in the case of benzyl mercaptan. The formation of solid interferes with agitation and rapid reaction of the mercaptan salt formed in the aqueous caustic solution and the carbamyl chloride.

Generally, it has been found that any mercaptan and any carbamyl chloride can be used in the instant process, thereby the process is applicable to prepare esters of thiocarbamates, for example, of the formula

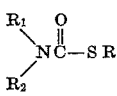

where the symbols $R_1$ and $R_2$ may independently represent groups selected from alkyl, for example, having from to 1 carbon atoms, inclusive;
alkenyl, for example, having at least 1 double bond and from 2 to 8 carbon atoms, inclusive;
haloalkyl, for example, having from 1 to 12 carbon atoms, inclusive, and halo is chloro, fluoro, or bromo;
cyano-substituted alkyl, for example, having from 2 to 6 carbon atoms, inclusive;
alkynyl, having at least one triple bond and from 3 to 6 carbon atoms, inclusive, for example, propargyl, isobutynyl, and the like;
cyclohexenyl;
haloalkenyl, for example, having from 2 to 8 carbon atoms, inclusive, and halo is chloro, fluoro or bromo;
benzyl;
substituted-benzyl, in which the substituents are, for example, chloro, lower alkoxy having 1 to 4 carbon atoms, inclusive, cyano, nitro and trifluoromethyl;
haloalkoxy, for example, having 1 to 8 carbon atoms, inclusive, and halo is chloro, fluoro or bromo;
alkoxy, for example, having 1 to 8 carbon atoms, inclusive;
alkenyloxy, for example, having at least 1 double bond and from 2 to 8 carbon atoms, inclusive;
nitroalkoxy, for example, having 1 to 6 carbon atoms, inclusive;
phenyl;
substituted-phenyl, in which the substituents are, for example, chloro, bromo, nitro, cyano, alkoxy having 1 to 4 carbon atoms, inclusive, phenyl and the like;
phenoxy-substituted alkyl, for example, in which alkyl has from 1 to 4 carbon atoms, inclusive;
naphthyl;
furfuryl, tetra-hydrofurfuryl;
cycloalkyl, for example, having from 3 to 7 carbon atoms, inclusive;
heterocyclic oxygen, nitrogen or sulfur-containing ring groups, for example, pyridyl, thienyl, furyl, pyranyl, pyrimidinyl, indolyl, quinolyl, isothiazolyl, piperidyl, piperazinyl, morpholinyl and the like;
alkyl-substituted pyridyl, for example, where alkyl has from 1 to 4 carbon atoms, inclusive.

$R_1$ and $R_2$ taken together with the nitrogen represent heterocyclic groups, e.g., pyrryl, pyrrolidyl, pyrazolyl, pyrazolinyl, piperidinyl, imidazolyl, indolyl, β-methylindolyl, aziridinyl, carbazolyl, morpholinyl, 3-azabicyclo-[3.2.2]nonanyl-3, poly alkyleneimine, having 3 to 6 carbon atoms, inclusive, alkyl-substituted piperidine, for example, 5-ethyl-2-methyl piperidine.

R represents alkyl, for example, having 1 to 12 carbon atoms, inclusive;

haloalkyl, preferably chloro or bromo-substituted alkyl, for example, the alkyl has from 1 to 12 carbon atoms, inclusive;
alkylthioalkylene, for example, having a total of from 2 to 10 carbon atoms, inclusive;
alkoxyalkylene, for example, having a total of from 2 to 10 carbon atoms, inclusive;
cycloalkyl, for example, having 3 to 7 carbon atoms, inclusive;
alkenyl, for example, having at least 1 double bond and from 2 to 8 carbon atoms, inclusive;
alkynyl, having at least one triple bond and from 3 to 6 carbon atoms, inclusive, for example, isobutynyl, 3-methyl-butyn-(1)yl(3);
phenyl;
naphthyl;
benzyl;
α-alkyl benzyl, for example, in which the alkyl has 1 to 4 carbon atoms, inclusive;
sub-phenyl wherein said substituents include alkoxy having 1 to 4 carbon atoms, inclusive, nitro, chloro, trifluoro, methyl, for example, O-methoxy, m-butoxy, p-nitro, 3,4-dinitro, 2,4-dinitro;
substituted-naphthyl, for example, wherein said substituents include alkoxy, nitro, chloro, bromo, trifluoromethyl;
haloalkenyl, for example, in which alkenyl has 2 to 6 carbon atoms, inclusive, and halo is chloro, bromo, iodo or fluoro, for example, 2,3-dichloroallyl, 3,4,4-trifluoro-3-butenyl, 2-bromoallyl, and the like;
cyclohexenyl;
substituted-benzyl, wherein the substituents are, for example, halo, chlorine, bromine, fluorine, methyl-p-methyl, o-methyl, 2,4-dimethyl, 2,6-dimethyl, 2,4-dichloro, 3,4-dichloro, ar,ar,ar-trichloro, 5-chloro-2-methoxy, nitro;
carboalkoxyalkyl, for example, having from 2 to 8 carbon atoms, inclusive;
phenyl thioethyl;
phenyl oxyethyl;
pyrimidyl;
pyridyl;
indazolyl;
quinolyl;
isoquinolyl;
furyl;
dibenzofuryl.

The present invention may be practiced in a batch or batch-like form or in a continuous or continuous-like form. When the invention is practiced in a manner resembling a batch process, all the various liquids and various reactants will be brought together and various steps determined by the proper time sequence into a single body of liquid. The batch process may be altered by using suitable reactors such that a continuous or continuous-like form of the process is achieved. In the continuous form of the inventive process, agitation of the reacting phases may continuously be practiced at a proper rate to continuously form a suitable mixing of droplets of the two phases in such a manner that a continuously supplied portion of the carbamyl chloride is added to a reactor in which the aqueous caustic concentration can be adjusted and the appropriate heat applied to achieve the desired reaction. Within the continuous system, the proper rate for reaction may be obtained by selecting the appropriate conditions. Both the batch and continuous aspects of the present invention are highly desirable, and choice there between will rest solely with the desired manufacturing conditions.

The reaction vessel consists entirely of non-corrosive materials, such as mild-steel, which will not interfere with the principal reaction.

The conditions of the reaction can be varied rather extensively without having appreciable effect on the yield or quality of the product. The temperature of the reaction can range from about 10 to about 100° C. and preferably from about 20 to about 80° C. More preferably, the reaction is to be performed at from about 40 to about 50° C. Within the temperature limits specified herein, it is found that esters of thiocarbamic acids can be prepared and that the undesirable by-product of the corresponding urea will be minimized. The selected temperature also determines the rate of the reaction; that is, the time required to economically and feasibly arrive at the product with a negligible amount of carbamyl chloride remaining. The reaction time, therefore, will depend upon several interacting factors, such as temperature and degree of agitation. These parameters will be developed hereinafter.

The ratio of reactants employed in the instant process can vary widely. However, with economic feasibilty as a basis, the ratio of mercaptan (RSH) to carbamyl chloride ($R_1R_2NCOCl$) must be at least about 1.1. The preferred ratio of mercaptan to carbamyl chloride is at least 1.2. That is an excess of mercaptan is used. This is advantageous in the case that the carbamyl chloride is expensive.

The ratio of caustic agent to mercaptan is at least 0.5, however, the preferred ratio of caustic agent to mercaptan is at least 1.0. The most preferred ratio of caustic agent to mercaptan is at least 1.5. That is, in the most preferred form, this process is carried out with an excess of caustic agent. By caustic agent, it is meant any inorganic material which will sufficiently produce hydroxyl ions in an aqueous solution to function in this process. The nature of the caustic agent must produce sufficient alkalinity in an aqueous solution to inhibit or suppress the hydrolysis of the mercaptide $RS^-$ ion to the mercaptan according to the equation: $RS^- + H_2O \rightleftharpoons RSH + OH^-$. The caustic agents contemplated for use in this process include among others, sodium hydroxide, potassium hydroxide, barium hydroxide, lithium hydroxide, strontium hydroxide, calcium hydroxide, and the like, and mixtures thereof. The caustic agent is supplied to the reaction scheme as an aqueous solution which can range from 10% to 50% and higher, such that the solution is liquid. For example, when using sodium hydroxide, the preferred range of caustic solution is 20% to 50%.

An important aspect of the process is to provide adequate agitation. The reaction will proceed slowly with little or no agitation. There will be various side reactions occurring which produce undesirable by-products or no reaction will occur and unreacted starting material will remain. Therefore, as a preferred step in the process, there must be an adequate means of agitation to form high surface area of the two liquid phases in the reaction vessel. Adequate agitation is essential to achieve rapid reaction and arrive at economic yields. Present in the reaction vessel are two phases, an organic phase or carbamyl chloride phase and aqueous phase containing the mercaptan and caustic agent. Adequate means of agitation can be accomplished, for example, by use of high speed stirrers, baffle plates within the reaction flask, together with high speed stirring, rapid circulation through mixing or turbulence columns and the like.

Upon completion of the process reaction, the thiocarbamate ester produced from the reaction remains in the organic phase. There may be some solid salt formation which can be removed easily by addition of water to dissolve the salt. The salt may be formed during the reaction. With two phases present in the reaction vessel, the two phases can be separated easily. The organic phase is dried by conventional means and the pure thiocarbamate ester obtained therefrom. Further purification can be accomplished by distillation. The product can be stripped of residual water and volatile components by purging with argon or nitrogen while heating.

Specific examples are set forth below showing the preparation of the esters of this invention. These examples are present herein for illustrative purposes only, and are not to be interpreted as imposing any limitations on the scope of the invention herein described, other than as set forth in the appended claims.

EXAMPLES

General Procedure

The general procedure used in the following experiments was as follows. An aqueous solution of sodium hydroxide was placed in an agitation flask equipped with a stirrer. The appropriate mercaptan was added to the aqueous solution. To this mixture was added the requisite carbamyl chloride while maintaining the flask and its contents at the indicated temperature. At the end of the experiment water was added to dissolve any precipitated salts and the organic layer containing the thiocarbamic acid ester was separated. The organic layer was either heated under a vacuum or purged with nitrogen while heating to remove residual water and mercaptan. The conditions, reactants and results are summarized and reported in the following table. The results are area percent from gas chromatography analysis of the material. In several instances, a weight percent purity also was determined and found to agree within experimental error to the gas chromatographic analysis.

| Experiment number | Temp., °C. | Ratio RSH/ $R_1R_2NCOCl$ | Ratio NaOH RSH | Conc., NaOH percent | Rxn. time, (min.) | Carbamyl chloride ($R_1R_2NCOCl$) | Ester product | By product |
|---|---|---|---|---|---|---|---|---|
| A. Preparation of S-ethyl hexahydro-1H-azepine-1-carbothioate: RSH=ethyl mercaptan, $R_1R_2NCOCl$= hexahydro-1H-azepine-1 carbamyl chloride ||||||||| 
| 1 | 28-35 | 1.2 | 1 | 20 | 30 | 28.7 | 65 | 6 |
| 2 | 28-35 | 1.2 | 1 | 20 | 90 | 2.3 | 62 | 34.8 |
| 3 | 45 | 1.2 | 1 | 33 | 20 | 21 | 78 | 0 |
| 4 | 45-47 | 1.2 | 1.6 | 50 | 75 | .6 | 98.8 | 0 |
| 5 | 44-50 | 1.2 | 1.6 | 50 | 115 | 0 | 99.1 | 0 |
| 6 | 50 | 1.2 | 1.6 | 50 | 60 | .3 | 99.5 | 0.2 |
| 7 | 60 | 1.2 | 1.6 | 50 | 20 | 6.14 | 93.4 | 0.49 |
|   | 60 | 1.2 | 1.6 | 50 | 45 | .3 | 97.8 | 1.8 |
| 8 | 55 | 1.2 | 1.6 | 50 | 65 | .42 | 99.0 | 0.41 |
|   | 55 | 1.2 | 1.6 | 50 | 80 | 0 | 99.5 | 0.5 |
| B. Preparation of S-benzyl di-n-propylthiocarbamate; RSH=benzyl mercaptan; $R_1R_2NCOCl$=di-n-propylcarbamyl chloride ||||||||| 
| 9 | 50-60 | 1.2 | 1.6 | 50 | 80 | 0 | 99.9 |  |
| 9a [1] | 50-60 | 1.2 | 1.6 | 50 | 60 | 0 | 98.8 | 0 |
| C. Preparation of S-propyl butylethylthiocarbamate; RSH=n-propyl mercaptan, $R_1R_2NCOCl$=butylethylcarbamyl chloride ||||||||| 
| 10 | 55 | 1.2 | 1.6 | 50 | 60 | 0 | 98.4 |  |
| D. Preparation of S-ethyl dipropylthiocarbamate; RSH=ethyl mercaptan, $R_1R_2NCOCl$=dipropylcarbamoyl chloride ||||||||| 
| 11 | 50-55 | 1.2 | 1.6 | 50 | 90 | 14.6 | 83.2 | 2.2 |
|   | 50-55 | 1.2 | 1.6 | 50 | 150 | 4.4 | 90.6 | 4.18 |
|   | 50-55 | 1.2 | 1.6 | 50 | 210 | 2.0 | 90.2 | 7.34 |
| 12 [2] | 50 | 1.2 | 1.6 | 50 | 90 | 2.5 | 95 | 12.2 |
| 13 [3] | 48-52 | 1.2 | 1.6 | 50 | 30 | 22 | 77.5 | 0 |
|   |   | 1.2 | 1.6 | 50 | 60 | 6 | 93 | 1.0 |
|   |   | 1.2 | 1.6 | 50 | 120 | .3 | 98 | 1.7 |

[1] Reaction conditions the same as Experiment #9 except that a mixture of the mercaptan and the carbamyl chloride was added to 50% NaOH solution.
[2] Conditions substantially the same as Experiment #11, except increased agitation employed.
[3] Conditions substantially the same as Experiment #12, except a creased flask and increased agitation employed.

As can be seen from the table, especially with reference to Experiments 1 and 2 performed under similar conditions except for the reaction time, substantial amount of thiocarbamic ester can be produced, but the longer reaction time produces undesirable by-products formation can be substantially reduced and the temperature allowed to increase if the ratio of caustic agent to mercaptan is increased, as seen in comparing Experiment 2 and 8 in the table.

Many modifications and variations of this invention may be made without departing from the spirit and scope thereof, and therefore only such limitations should be imposed as are indicated in the appended claims.

What is claimed is:

1. The process of preparing esters of thiocarbamic acids which comprises (a) reacting a carbamyl chloride with a mercaptain in the presence of an aqueous solution of a caustic agent; (b) separating the organic and aqueous phases; and (c) recovery of the thiocarbamic acid ester from the organic phase.

2. The process of reacting a carbamyl chloride with a mercaptan which comprises reacting the compounds in an aqueous solution of a caustic agent at a temperature of from about 10° C. to about 100° C. in the presence of an aqueous solution of a caustic agent and recovering therefrom the thiocarbamic ester.

3. The process according to Claim 2 in which the ratio of mercaptan to carbamyl chloride is at least 1.1:1, and the ratio of mercaptan to caustic agent is at least 1:0.5.

4. The process according to Claim 3 in which the ratio of mercaptan to carbamyl chloride is at least 1.2:1, and the ratio of mercaptain to caustic agent is at least 1:1.

5. The process of reacting a carbamyl chloride with a mercaptan which comprises reacting with agitation the compounds in an aqueous solution of a caustic agent at a temperature of from about 10° C. to about 100° C. in the presence of an aqueous solution of excess caustic agent and recovering therefrom the thiocarbamic ester.

6. The process according to Claim 5 in which said caustic agent is sodium hydroxide.

7. The process according to Claim 6 in which the ratio of mercaptan to carbamyl chloride is at least 1.2:1, and the ratio of mercaptan to caustic agent is at least 1:1.1.

8. The process for preparing thiocarbamic esters by reacting an aqueous solution of a carbamyl chloride of the formula

in which $R_1$ and $R_2$ taken together with the nitrogen represent polyalkyleneimine having 2 to 6 carbon atoms, inclusive; and a mercaptan of the formula

in which R is alkyl having 1 to 12 carbon atoms, inclusive, which comprises reacting the said compounds in an aqueous solution of excess caustic based upon the mercaptan at a temperature of from about 10° C. to about 100° C. with agitation and recovering therefrom the thiocarbamic ester.

9. The process for preparing thiocarbamic esters by reacting an aqueous solution of a carbamyl chloride of the formula

in which $R_1$ and $R_2$ are independently alkyl having from 1 to 12 carbon atoms, inclusive, and

in which R is alkyl having 1 to 12 carbon atoms, inclusive, which comprises reacting the said compounds in an aqueous solution of excess caustic based upon the mercaptan at a temperature of from about 10° C. to about 100° C. with agitation and recovering therefrom the thiocarbamic ester.

10. The process for preparing thiocarbamic esters by reacting an aqueous solution of a carbamyl chloride of the formula

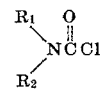

in which $R_1$ and $R_2$ are independently alkyl having from 1 to 12 carbon atoms, inclusive; and

RSH in which R is benzyl, which comprises reacting the said compounds in an aqueous solution of excess caustic based upon the mercaptan at a temperature of from about 10° C. to about 100° C. with agitation and recovering therefrom the thiocarbamic ester.

11. The process for preparing thiocarbamic esters by reacting an aqueous solution of a carbamyl chloride of the formula

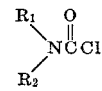

in which $R_1$ and $R_2$ are independently alkyl having from 1 to 12 carbon atoms, inclusive; and

RSH in which R is haloalkneyl having at least one double bond and 2 to 6 carbon atoms, inclusive, and halo is selected from chloro, bromo, iodo and fluoro; which comprises reacting the said compounds in an aqueous solution of excess caustic based upon the mercaptan at a temperature of from about 10° C. to about 100° C. with agitation and recovering therefrom the thiocarbamic ester.

12. The process for preparing thiocarbamic esters by reacting a carbamyl chloride of the formula

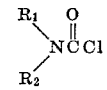

in which $R_1$ and $R_2$ are independently alkyl having from 1 to 12 carbon atoms, inclusive; and

RSH in which R is substituted benzyl in which the substituents are selected from chloro, lower alkoxy having 1 to 4 carbon atoms, inclusive, intro, chloro, trifluoromethyl, which comprises reacting said compounds in an aqueous solution of excess caustic based upon the mercaptan at a temperature of from about 10° C. to about 100° C. with agitation and recovering therefrom the thiocarbamic ester.

13. The process according to Claim 8 in which said carbamyl chloride is hexahydro-1H-azepine-1 carbamyl chloride and said mercaptan is ethyl mercaptan.

14. The process according to Claim 9 in which said carbamyl chloride is butylethyl carbamyl chloride and said mercaptan is n-propyl mercaptan.

15. The process according to Claim 9 in which said carbamyl chloride is dipropyl carbamyl chloride and said mercaptan is ethyl mercaptan.

16. The process according to Claim 10 in which said carbamyl chloride is di-n-propyl carbamyl chloride.

References Cited

UNITED STATES PATENTS

| | | | |
|---|---|---|---|
| 3,284,184 | 11/1966 | Zerbe | 260—455 A |
| 3,558,685 | 1/1971 | Osieka et al. | 260—455 A |
| 2,913,327 | 11/1959 | Tilles | 260—455 A |

FOREIGN PATENTS

| | | | |
|---|---|---|---|
| 2,019,491 | 4/1970 | Germany | 260—455 A |

OTHER REFERENCES

J. Org. Chem., Tilles, vol. 81, 714–727.
J. Amer. Chem. Soc., Wuest, vol. 73, 1210–16.

LEWIS GOTTS, Primary Examiner

D. R. PHILLIPS, Assistant Examiner

U.S. Cl. X.R.

260—293.85, 326.83, 455 A, 543 R, 544 C